Aug. 28, 1962 J. H. POMERENE ETAL 3,051,387

ASYNCHRONOUS ADDER-SUBTRACTOR SYSTEM

Filed Feb. 24, 1959 6 Sheets-Sheet 1

ASYNCHRONOUS ADDER-SUBTRACTOR SYSTEM

Filed Feb. 24, 1959 6 Sheets-Sheet 3

Aug. 28, 1962 J. H. POMERENE ET AL 3,051,387

ASYNCHRONOUS ADDER-SUBTRACTOR SYSTEM

Filed Feb. 24, 1959 6 Sheets-Sheet 4

ASYNCHRONOUS ADDER-SUBTRACTOR SYSTEM

Filed Feb. 24, 1959 6 Sheets-Sheet 5

United States Patent Office 3,051,387

Patented Aug. 28, 1962

3,051,387

ASYNCHRONOUS ADDER-SUBTRACTOR SYSTEM

James H. Pomerene and John Cocke, Poughkeepsie, N.Y., assignors to International Business Machines Corporation, New York, N.Y., a corporation of New York Filed Feb. 24, 1959, Ser. No. 794,944
18 Claims. (Cl. 235—153)

This invention relates to digital computer systems and particularly concerns circuit arrangements providing for addition or subtraction of binary numbers.

In synchronous add or subtract systems, the time interval necessarily allowed for completion of the addition of any two binary numbers must be sufficiently long to provide for propagation of carries through every order of the highest order number the system is capable of handling. Since on the average, the highest order of the particular numbers involved is far less than the capacity of the system, much time is wasted.

In accordance with the present invention, as utilized for addition, for example, while the system is adding a particular pair of binary numbers, it also concurrently adds the complements of such numbers and combines the results of both additions, including the carries, to produce a check signal indicating that the addition has been completed and that the result is correct. As used to effect subtraction of two binary numbers, one portion of the system adds the complement of the minuend to the true value of the subtrahend to produce the true difference of their true values while another portion of the system adds the complement of the subtrahend to the true value of the minuend to produce the complement of the true difference of the true values. The results of both additions, including borrows, are combined to produce a check signal indicating that subtraction of the true values has been completed and that the result is correct. As soon as such overall check signal is produced, the next instruction may be immediately given without delay corresponding with higher orders not involved in addition or subtraction of that pair of numbers. Since the time consumed for addition or subtraction of any particular pair of numbers is no greater than required for the actual number of carries involved, the total time required to execute a series of instructions is, on the average, much less than required by a synchronous adder to execute the same series of instructions to obtain an unchecked result.

More particularly, each stage of the new system as used for addition includes two full adders, one of which, for brevity termed the "true" adder, combines the true binary values of the digits of the corresponding order and the carry input of that stage, and the other of which, for brevity termed the "complement" adder, combines the complementary values of those digits and the complement of the input carry to that stage. As used for subtraction, the true adder of each stage combines the true value of the minuend digit of the corresponding order with the complement of the true value of the subtrahend digit of the same order and with the in-borrow, if any; the complement adder of each stage combines the complement of the minuend digit with the true value of the subtrahend digit and with the complement of the in-borrow. The sum output of the true adder of each stage is stored in the sum or difference register of that stage so that the sum or difference registers jointly indicate the total of the digital addition or subtraction performed. The carry or borrow outputs of the true and complement adders of each stage are combined, as in an EXCLUSIVE-OR circuit, to produce a check signal indicative of completion of the addition or subtraction of the digits of the corresponding order. The sum or difference outputs of the true and complement adders of each stage are combined, as in an EXCLUSIVE-OR circuit, to provide a check signal indicative of the correctness of the binary digit stored in the sum or difference register of that stage.

More particularly, the "complete" signals of the stages may be combined, as in an AND-gate, to provide an over-all check signal indicative of completion of the adding or subtracting operation by all the stages involved for the particular pair of numbers, and the "correct" signals of all stages may be combined, as in an AND gate, to provide a second over-all check signal indicative of correctness of the total stored in the sum registers. Furthermore, the two over-all check signals may be combined to produce a single signal indicating both completion by the system of the adding or subtracting operation and correctness of the total stored in the sum or difference registers. Such signal may be utilized immediately to initiate the next cycle of operation of the system. Alternatively, the "correct" and "complete" signals of each stage may be combined to provide a single check signal indicating that the particular stage has completed its carries or borrows and that the stored sum or difference is correct. All of such stage signals may then be combined, as in an AND gate, to provide a single over-all check signal indicating both completion by the system of the adding or subtracting operation and correctness of the total stored in the sum or difference registers.

The invention further resides in a system having features of novelty and utility hereinafter described and claimed.

For a more detailed understanding of the invention, reference is made to the accompanying drawings in which.

Figure 1:
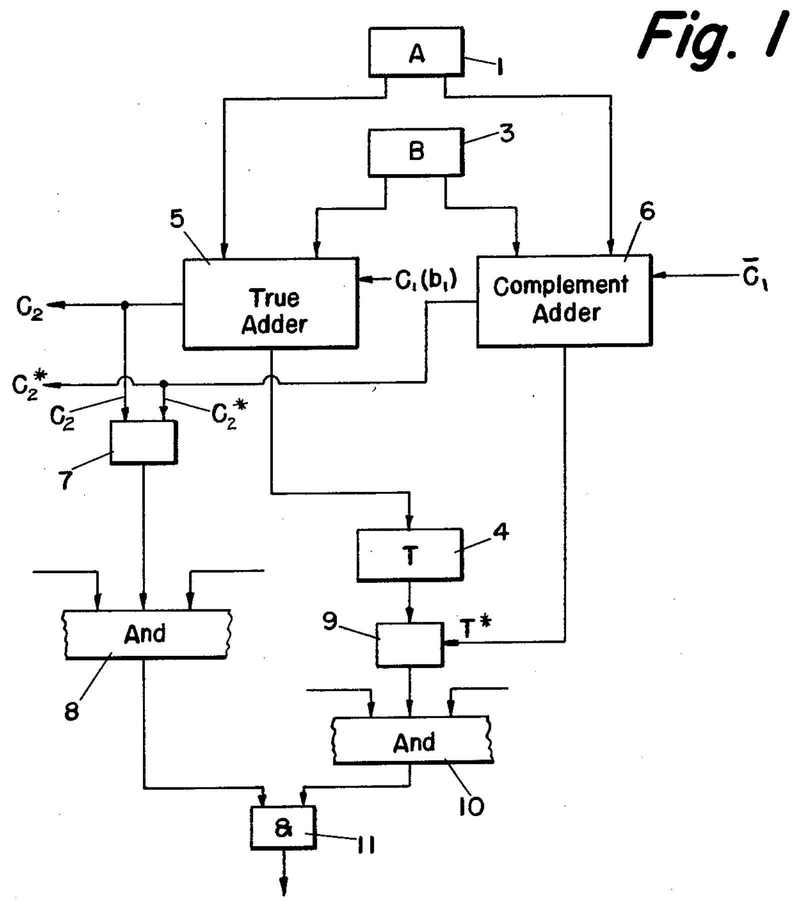
FIG. 1 is a block diagram of the basic network of a single stage.

Referring to FIG. 1, the blocks 2, 3 and 4 are generically representative of devices or registers, each capable of storing information in the binary code. By way of example, these devices may be flip-flop or bistable multivibrator circuits, using electronic tubes, transistors or the like. The block 5 is generically representative of means for combining signals representing the true values A, B of the binary numbers stored in the registers 2 and 3 and a signal representing the true value of the input carry $C_1$ to produce outputs respectively representing the resulting sum T and the resulting output carry $C_2$. The sum output T is applied to the register 4 and the carry $C_2$ is passed on to the next higher order stage.

In the upper five lines of Table I below, there are shown in the successive columns all of the various combinations of digital values of the augend A and addend B of any input carry $C_1$, the resulting values of the sum T and of any carry $C_2$ to the next higher order. This upper part of Table I corresponds with the binary addition rules of a full adder.

*Table I (Addition)*

| | | | | | | | | |
|---|---|---|---|---|---|---|---|---|
| Augend A | 0 | 1 | 0 | 1 | 0 | 1 | 0 | 1 |
| Addend B | 0 | 0 | 1 | 1 | 0 | 0 | 1 | 1 |
| In-Carry $C_1$ | 0 | 0 | 0 | 0 | 1 | 1 | 1 | 1 |
| Sum T | 0 | 1 | 1 | 0 | 1 | 0 | 0 | 1 |
| Out-Carry $C_2$ | 0 | 0 | 0 | 1 | 0 | 1 | 1 | 1 |
| Augend $\bar{A}$ | 1 | 0 | 1 | 0 | 1 | 0 | 1 | 0 |
| Addend $\bar{B}$ | 1 | 1 | 0 | 0 | 1 | 1 | 0 | 0 |
| In-Carry $\bar{C}_1$ | 1 | 1 | 1 | 1 | 0 | 0 | 0 | 0 |
| Sum T * | 1 | 0 | 0 | 1 | 0 | 1 | 1 | 0 |
| Out-Carry $C_2$* | 1 | 1 | 1 | 0 | 1 | 0 | 0 | 0 |

The block 6 of FIG. 1 is generically representative of means for adding the complements of the true values A, B and $C_1$ to produce a sum output signal T* and a carry output $C_2$*.

The lower five lines of Table I show in successive columns all of the various combinations of the complement values $\bar{A}$, $\bar{B}$, $\bar{C}_1$, the resulting values of their sum $\bar{T}$ and of any carry $C_2$* to the next higher order.

Thus, each vertical column of Table I indicates a particular pair of digital values of augend A, addend B and input carry $C_1$, the resulting sum T, the resulting carry $C_2$, the complement values $\bar{A}$, $\bar{B}$ of the augend and addend, the complement value $\bar{C}_1$ of the input carry, the sum T* of such complement values and the carry $C_2$*. As evident from Table I, for any pair of addend and augend digits A, B when the additions, including carries, are complete in both of the adders 5 and 6, the carry outputs $C_2$, $C_2$* are complementary to each other, i.e., one of such outputs will be a positive signal representing 1 and the other will be a negative signal representing 0.

By impressing such output carry signals on a comparator 7, such as an EXCLUSIVE-OR circuit, there is thus provided a check signal indicating completion of the addition operation by that stage of the digits of the corresponding order of the complete numbers stored in the augend and addend registers of the system. By combining all of such "completion" signals of the individual stages in an AND gate 8, there may be provided an over-all check signal indicative of completion of addition by all stages involved of the total addend and augend stored in the registers of those stages.

The sum-output T of the true adder 5 of each stage is stored in the register 4 of that stage and is checked by comparator 9, which may be an EXCLUSIVE-OR circuit, against the sum output T* of the complement adder 6. When the inputs T, T* of the comparator 9 are complements of one another, the comparator 9 produces an output signal. That such signal is indicative of correctness of the digital sum T stored in the register 4 is evident from the corresponding columns of lines 4 and 9 of Table I.

By applying the "correct" signals of the individual stages to an AND gate 10, there is provided an over-all check signal indicative of the correctness of the total sum stored in the registers 4 of the system.

The outputs of the AND gates 8 and 10 may be impressed upon an AND circuit 11 to provide a single signal which indicates both completion of the addition of the two binary numbers stored in the addend and augend registers 2, 3 of the system and correctness of the sum stored in the registers 4 of the system.

Figure 1A:
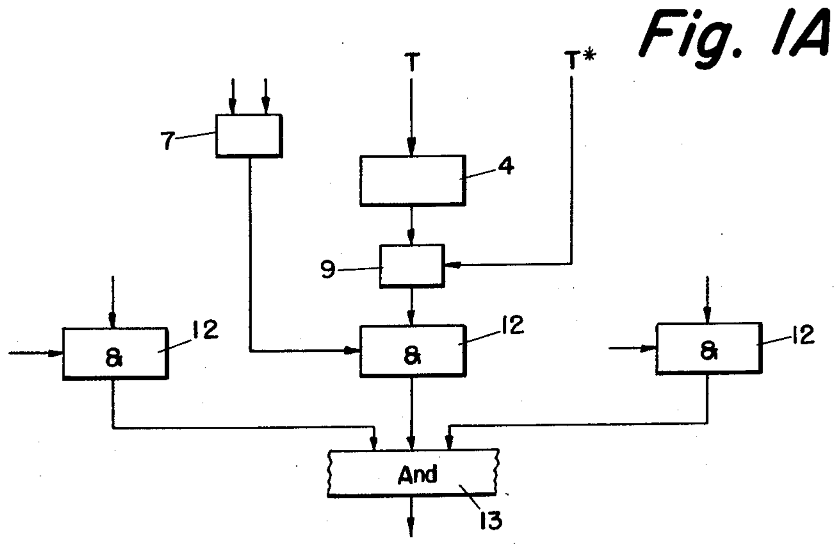
FIG. 1A is a modification of part of FIG. 1.

As an alternative to the foregoing, the "complete" and "correct" signals of each stage may be combined, as shown in FIG. 1A, in an AND circuit 12 to provide a signal indicating that so far as that individual stage is concerned, the addition has been completed and that the digital sum stored in its register is correct. The output signals of such AND circuits 12 of all stages may then be combined in an AND gate 13 to provide a single signal indicating that all of the stages involved have completed their respective digital additions and that the total sum stored in their registers is correct.

Reverting to FIG. 1: in addition, there is never any input carry supplied to the true adder of the first stage. Consequently, for this stage, and this stage only, it is necessary synthetically to supply a carry input for the complement adder 6 (see columns 1 to 4 and lines 3 and 8 of Table I); that is, for the first stage, the carry $C_1$ to the true adder 5 is always a ZERO signal and the carry $\bar{C}_1$ to the complement adder 6 is always a ONE signal.

The basic network of FIG. 1 is also suited for use in a system for effecting subtraction of binary numbers, for producing a signal indicative of completion of the subtraction, and for producing a signal indicating correctness of the difference stored in register 4. No more is involved than effectively interchanging the outputs of each of the B registers 3 to the associated true and complement adders 5, 6 and providing that the out-carry of the highest order stage be applied as the in-carry of the first stage.

With the B outputs of registers 3 so reversed, the true adders 5 add the true values of the minuend digits as stored in registers 2 with the complements of the true values of the subtrahend digits stored in registers 3 so that when the carries are completed, the true difference is stored in the registers 4. To give a specific example, let it be assumed that 6 is to be subtracted from 13. In such case, the binary digits stored in the A registers of the first four stages are 1101 and the binary digits stored in the B registers thereof are 0110. However, because of the aforesaid reversal of the outputs of the B registers, the binary complement of 6, i.e., 1001 is supplied to the true adders 5 for combination with the true binary value 1101 from the A registers. The initial difference resulting from this subtraction by complement addition is 0110 but since the out-carry is 1001, there is an end-around carry from the last to the first stage which gives a corrected difference T of 0111 (i.e., 7).

With the B outputs of registers 3 so reversed, the complement adders 6 add the binary complement of 13 (i.e., 0010) with true binary value of 6 (i.e., 0110). The result of such addition is a sum check T* of 1000 which is the complement of the aforesaid corrected difference T and an out-carry check $C_2$* of 0110 which is the complement of the aforesaid out-carry $C_2$.

Thus for the assumed example of subtraction, the comparators 7 and 9 of each stage will produce signals respectively indicating that the out-carry and the stored difference are correct. The check signals of the individual stages may be combined to produce a single signal indicating that the subtraction, including all carries, is complete and that the total difference stored in registers 4 is correct.

Figure 2:
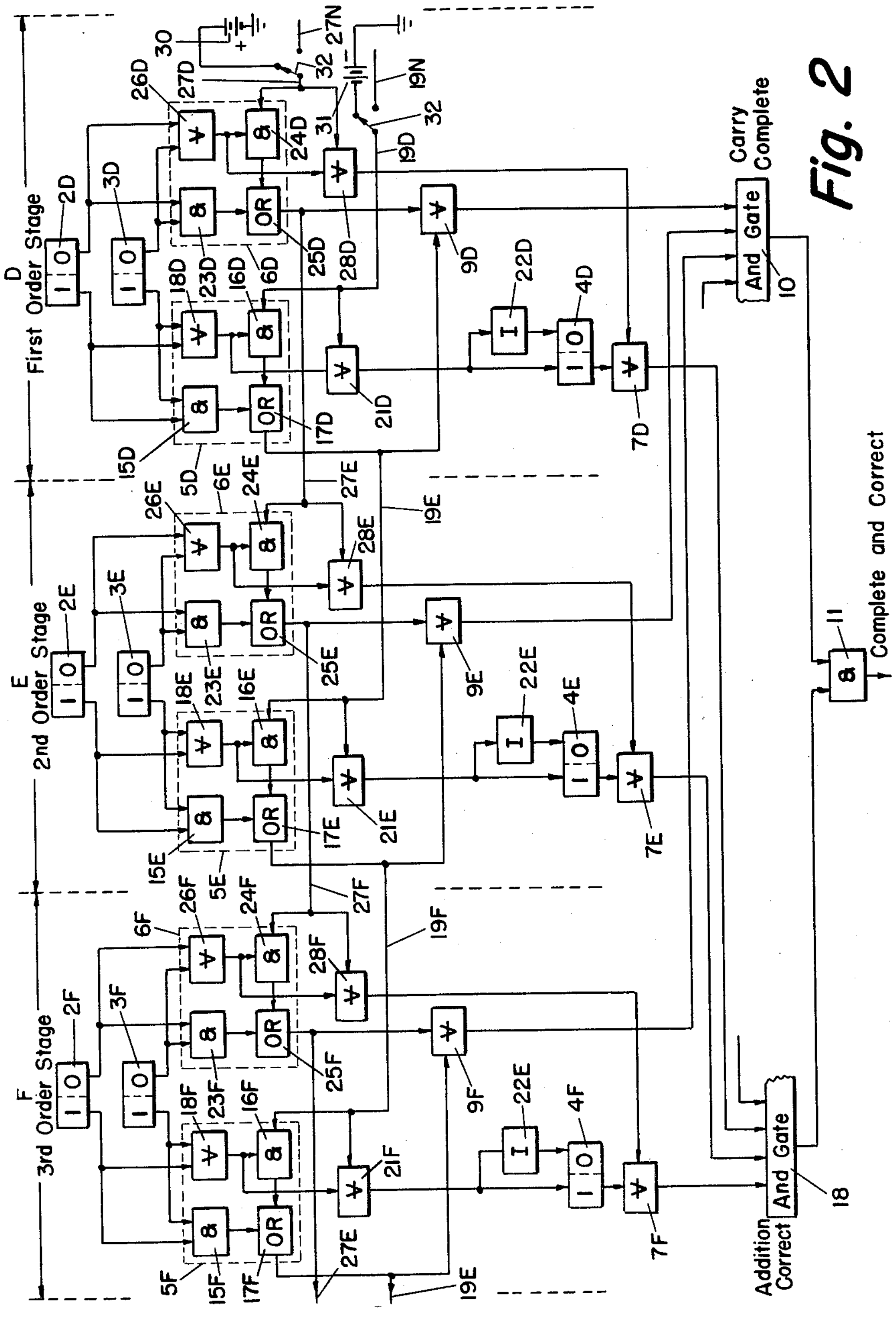
FIG. 2 is a block diagram of the first three stages of an asynchronous adder system utilizing preferred circuitry.

FIG. 2 illustrates a preferred embodiment of 1 of FIG. 1, and in more detail shows the composition of the first three stages D, E, F of a multi-order adder having N stages. As the elements and their interconnections are essentially the same for all stages, only one stage need be described in detail. The corresponding elements of the different order stages are identified by the same reference characters with the suffixes D, E or F identifying the stage in which the element is included.

Referring, for example, to the second stage E, the elements 2E, 3E and 4E are bistable trigger or flip-flop circuits for respectively storing the binary values A, B of the corresponding order of multi-order binary numbers and of the sum T of such digits.

The first or true adder 5E comprises two AND circuits 15E, 16E; an OR circuit 17E; and an EXCLUSIVE-OR circuit 18E. The AND circuit 15E produces an output only when the values of the digits stored in Registers 2E, 3E are both 1. The EXCLUSIVE-OR circuit 18E produces a sum output signal only when the value of one or the other, but not both, of the digits stored in registers 2E, 3E is 1. The AND circuit 16E produces an output only when it receives a signal both from the aforesaid EXCLU- SIVE-OR circuit 18E and an input carry signal supplied by line 19E from the true adder 5D of the preceding stage. When either, or both, of the AND circuits 15E, 16E of true adder 5E supply a signal to the OR circuit 17E, it supplies an output carry signal transmitted by line 19F to the true adder 5F of the next higher order stage.

The sum output signal of the true adder 5E and the input carry signal thereto are applied to the EXCLUSIVE-OR circuit 21E. When either, but not both, of these signals has a value corresponding with 1, the output of the EXCLUSIVE-OR circuit 21E is stored as 1 in the sum register 4E. When neither, nor both of these signals has a value of 1, the inverter 22E receives no signal from circuit 21E and accordingly 0 is stored in the sum register for E.

While this addition of the true values of the digits stored in registers 2E, 3E is being performed by the true adder 5E, the complements of these digital values are being effectively added in the second or complement adder 6E. In composition, the second adder 6E is the same as the first added 5E; specifically, it includes two AND circuits 23E, 24E; an OR circuit 25E; and an EXCLUSIVE-OR circuit 26E. When 0 is stored in either of the registers 2E or 3E, it produces an output signal corresponding with 1. The AND circuit 23E produces an output only when the true values of the digits stored in the registers 2E, 3E are both 0. The EXCLUSIVE-OR circuit 26E produces a sum output signal only when the true value of one or the other, but not both, of the digits stored in registers 2E, 3E is 0. The AND circuit 24E produces an output signal only when it receives both a signal from the EXCLUSIVE-OR circuit 26E and an input carry signal transmitted by line 27E from the complement adder 6D of the preceding stage. When either, or both, of the AND circuits 23E, 24E supply a signal to the OR circuit 25E, the latter provides a complement carry signal transmitted by line 27F to the complement adder 6F of the next higher order stage.

The sum output signal of the complement adder 6E and the input carry signal thereto are applied to the EXCLUSIVE-OR circuit 28E. When either, but not both, of these signals has a value corresponding to 0, the EXCLUSIVE-OR circuit 28E produces an output signal used for checking the correctness of the value stored in register 4E.

As above explained in discussion of FIG. 1, when the additions, including the carries, have been correctly performed, the sum ouput signals of the true and complement adders should be complements of one another. In FIG. 2, the production of the "correct" signal is effected by impressing the outputs of the aforesaid EXCLUSIVE-OR circuits 21E and 28E upon the EXCLUSIVE-OR circuit 7E. Thus, when either, but not both, of these sum output signals corresponds with 1 or 0, the comparator 7E produces an output signal indicating that the digital sum value stored in register 4E is correct.

As above explained in discussion of FIG. 1, when the additions, including carries, have been completed, the carry outputs of the true and complement adders should be complements of one another. In FIG. 2, the production of the "complete" signal is effected by impressing the carry outputs of the two adders 5E, 6E upon the EXCLUSIVE-OR comparator 9E. Thus, when either one, but not both, of the carry output signals corresponds with 1 or 0, the comparator 9E produces an output signal indicating completion by stage E of addition of the values stored in the registers 2E, 3E and completion of the carry operations.

As explained in discussion of FIG. 1, the outputs of all of the comparators 9D–9N of the complete system may be applied to an AND GATE 10 (FIG. 2) which, when all of the stages involved have produced a "complete" signal, will produce a "complete" signal for the whole system. The higher order stages not involved in the addition of any particular pair of binary numbers produce their "complete" signals from the outset so that the interval for production of the "over-all complete" signal does not include any carry-propagation time for such stages. Also, as explained in discussion of FIG. 1, the outputs of all of the comparators 7D–7N of the complete system, in part shown by FIG. 2, may be applied to an AND gate 8 so to produce a "correct" signal for the entire system when all of the stages involved have each produced a "correct" signal. The higher order stages not involved in addition of any particular pair of binary numbers produce "correct" signals from the outset so that the interval for production of the "over-all" signal does not include any carry-propagation time for such stages. Also as discussed in connection with FIG. 1, the outputs of the two AND gates 8, 10 may be combined to provide a single over-all signal indicating that the system as a whole has correctly completed the addition of the binary numbers stored in its augend and addend registers. The alternative arrangement, shown in FIG. 1A, of combining the "complete" and "correct" signals of individual stages is also applicable to FIG. 2.

Figure 2A:
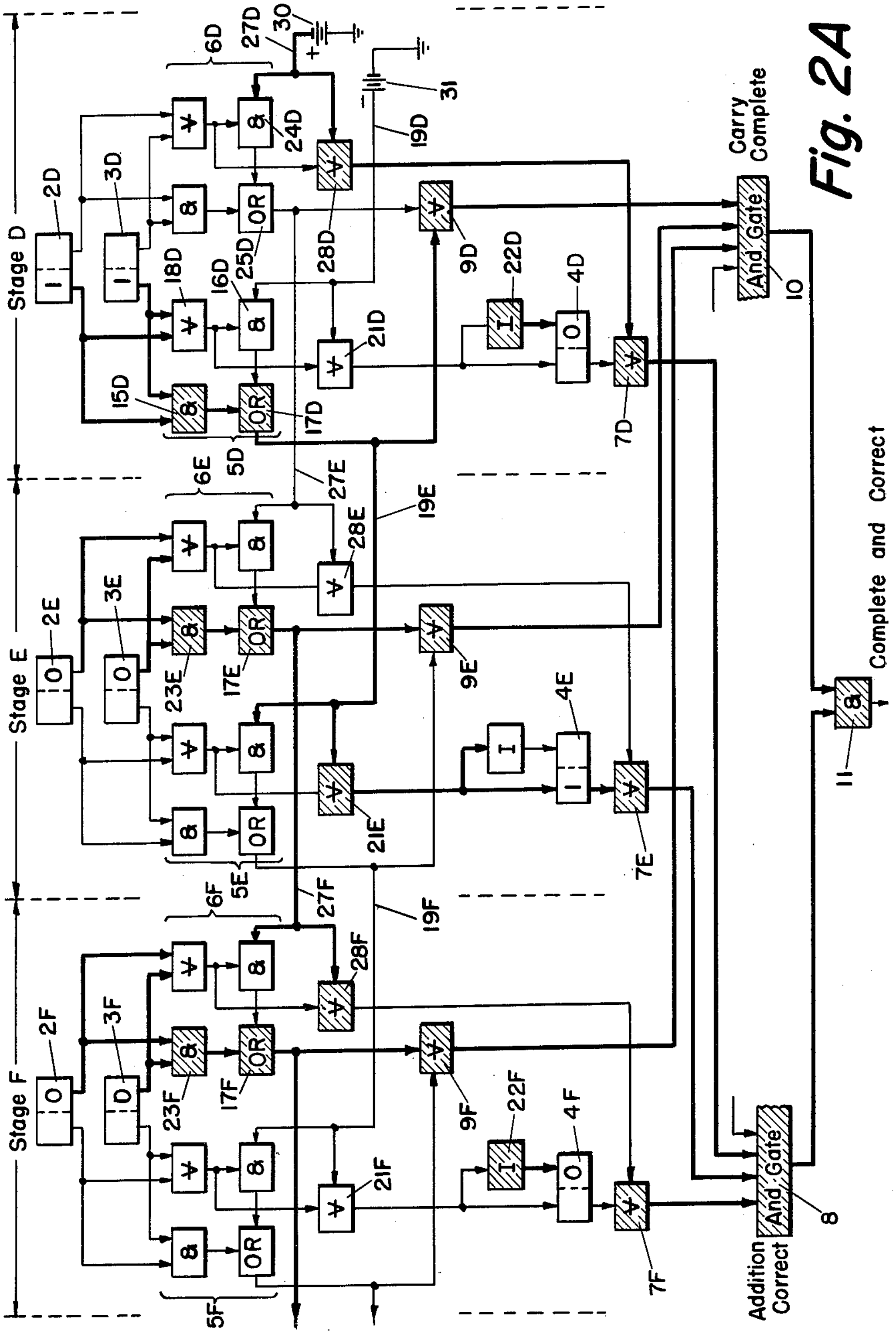
FIG. 2A is similar to FIG. 2 but identifies the circuits activated for addition of a particular pair of binary numbers.

In FIG. 2A, the heavy lines indicate the circuits of FIG. 2 which are activated by positive signals for addition of the binary number 001 stored in the addend registers 3D–3F to the binary number 001 stored in the augend registers 2D–2F. For addition, the in-carry line 19D is continuously supplied with a negative signal (corresponding with carry of 0) from source 31 and the complement in-carry line 27D is continuously supplied with a positive signal from source 30.

In the first stage D, the 1 outputs of the registers 2D–3D as applied to the AND circuits 15D of true adder 5D result in activation of the OR circuit 17D to produce a positive signal (corresponding with an out-carry $C_2$ of 1) transmitted by line 19E to the true adder 5E of stage E (see column 4, lines 1, 2 and 5 of Table I). The 1 outputs of registers 2D, 3D as applied to the EXCLUSIVE-OR circuit 18D of the true adder 5D produce a negative signal. Since both inputs to the EXCLUSIVE-OR circuit 21D are negative, its output is negative. Consequently, the inverter 22D produces a positive signal stored as 0 in the sum register 4D (see column 4, line 4 of Table I). As the input carry is 0, these operations complete the addition of the true values of the first order digits of the aforesaid numbers 001 and 001 (see column 4, lines 1 to 5 of Table I).

Concurrently with these operations of the true adder 5D, the complement adder 6D is effectively performing the addition indicated in column 4, lines 6 to 10 of Table I. Since the only positive signal applied to the complement adder 6D is the complement input carry on line 27D, the OR circuit 25D produces a negative signal. Consequently, the complement outcarry $C_2^*$ transmitted by line 27E to the complement adder 6E of the next stage is 0 (see column 4, line 10 of Table I). Since only one of the input circuits of the EXCLUSIVE-OR comparator circuit 9D is activated, it supplies to the AND-gate 10 a positive signal indicating that the first stage D has completed the addition, including carries, of first order digits 1,1 stored in the registers 2D, 3D. Since one only of the input circuits of the EXCLUSIVE-OR comparator circuit 7D is activated by a positive signal, it supplies to the AND-gate 8 a signal indicating that the digit 0 stored in Sum register 4D of the first stage D is correct (see column 4, line 9 of Table I).

In the second stage E, the only positive signal supplied to the true adder 5E is the carry 1 signal from the true adder 5D of the preceding stage. The operations to be performed by the true adder 5E are those indicated in column 5, lines 1 to 5 of Table I. The negative output of the true adder 5E as transmitted by line 19F of the true adder 5F of stage F is a 0 (see column 5, line 5 of Table I). With a negative signal supplied to it from adder 5E and with a positive signal supplied to it over the input carry line 19E, the EXCLUSIVE-OR circuit 21E produces a positive signal which is stored as 1 in the Sum register 4E of stage E (column 5, line 4 of Table I). This completes the addition of the true values of the digits stored in and supplied to stage E.

Concurrently with these operations of the true adder 5E, the complement adder 6E is effectively performing the addition indicated in column 5, lines 6 to 10 of Table I, i.e., addition of the complements of the augend, addend and input carry. With 0's stored in the 2E, 3E registers, the AND circuit 23E is activated by positive signals corresponding with two 1's. The resulting positive output signal of AND circuit 23E activates the OR circuit 17E to produce a positive complement-carry signal (corresponding with 1) supplied by line 27F to the complement adder 6F of the next higher stage F. This positive complement-carry signal is also applied to the comparator 9E of stage E. Since the true carry signal also applied to comparator 9E from true adder 5E is effectively a 0, the comparator 9E produces a positive signal indicating that the addition, including carries, is complete. This "complete" signal of stage E is applied to the AND-gate 10.

The comparator 7E receives a positive signal from the EXCLUSIVE-OR circuit 21E, either directly or from register 4E, and a negative signal from the EXCLUSIVE-OR circuit 28E in th esum-output circuit of the complement adder 6E. Consequently, the comparator 7E produces a positive output signal indicating that the digit 1 stored in the Sum register 4E is correct. This "correct" signal of stage E is applied to the AND-gate 8.

In the third stage F, no positive signal is applied to the true adder 5F either from the registers 2F, 3F or from the input carry line 19F, i.e., the augend, addend and input carry of this stage all have a value of 0. The true adder 5F therefore performs the addition indicated in column 1, lines 1 to 5 of Table I. With both of its inputs negative, the EXCLUSIVE-OR circuit 21F produces a negative output. Consequently, the output of the inverter 22F is positive and is stored as a 0 in the Sum register 4F. The sum output and the carry output of the first adder 5F are both negative and so correspond with 0 (column 1, lines 4, 5 of Table I). This completes the operation of the true adder 5F.

Concurrently with such operation, the second adder 6F of stage F is performing the complementary addition corresponding with column 1, lines 6 to 10. The 0's stored in the 2F, 3F registers produce positive signals for the complement adder 6F (column 1, lines 6, 7 of Table I). The complement adder 6F also receives a positive signal from the complement carry line 27F (column 1, line 8 of Table I). With both of its inputs so activated, the AND circuit 23F produces a positive output which activates the OR circuit 17F. The resultant positive complement-carry output is applied to the comparator 9F. Since this comparator receives a negative carry output signal from the true adder 5F, it produces a positive output signal indicating completion of the addition of the third order digits (column 1, lines 5 and 10 of Table I).

This "complete" signal of stage F is applied to AND-gate 10. Since all of the three stages involved have now each applied a "complete" signal to the AND-gate 10, it produces an output indicating that addition of the number 001 stored in registers 2D–2F of the system to the number 001 stored in registers 3D and 3F of the system has been completed.

The negative sum-out signal of the complement adder 6F and the positive complement-input carry as applied to the EXCLUSIVE-OR circuit 28F activate it to produce a positive output signal corresponding with a value of 1 for T* (column 1, line 9 of Table I). The comparator 7F thus receives a negative signal from the true adder 5F and a positive signal from the complement adder 6F. Consequently, this comparator produces a positive output signal indicating that the 0 stored in the Sum register 4F is correct.

This "correct" signal of stage F is applied to the AND-gate 8. Since all of the three stages involved have now each applied a "correct" signal to the AND-gate 10, it produces an output indicating that the total sum 010 stored in the sum registers 4D–4F is correct.

When the output signals of both AND-gate 8 and AND-gate 10 are applied to the AND circuit 11, the latter produces a "complete" and "correct" signal indicating that the system has completed the addition of the binary numbers respectively stored in its 2, 3 registers and that the resultant sum stored in its 4 registers is correct. This over-all check signal may be utilized immediately to start the next addition, effected, for example, by loading one or the other or both of the 2, 3 registers in manner per se known.

If for any reason, such as development of a fault, any stage of the computer fails to complete or correctly perform the addition above described, one or the other, or both, of the comparators 7, 9 of that stage will not produce an output signal. The location of the fault is thus localized, so facilitating repair or replacement of the defective component or connection.

Figure 2B:
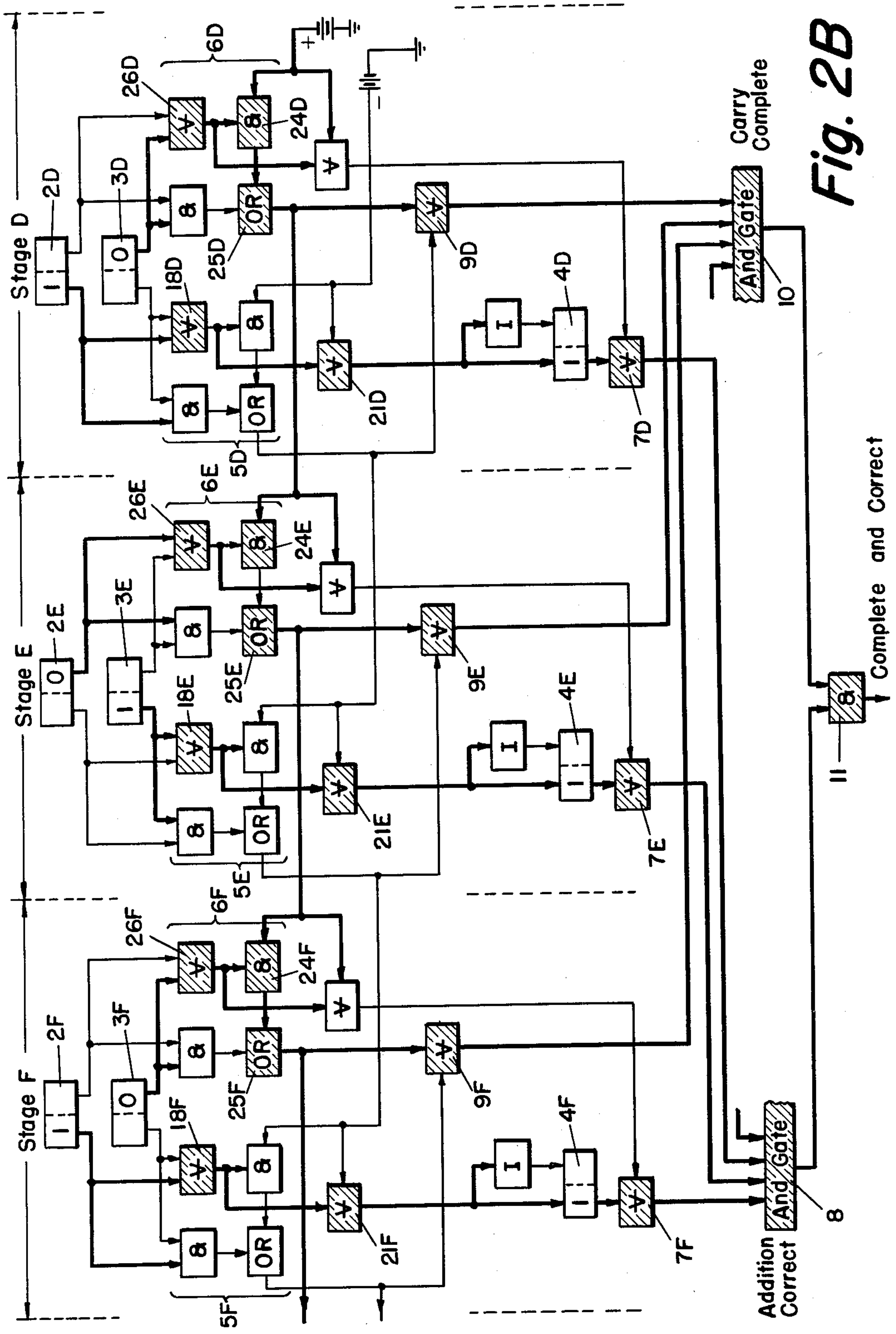
FIG. 2B is similar to FIGS. 2 and 2A but identifies the circuits activated for addition of a different pair of binary numbers.

In FIG. 2B, the heavy lines indicate the circuits of FIG. 2 activiated for addition of the binary number 010 stored in registers 3D and 3F to the binary number 101 stored in registers 2D–2F.

The true adders 5D, 5F of stages D and F each performs the addition shown in column 2, lines 1 to 5 of Table I, while the complement adders 6D, 6F of those stages each performs the complement addition shown in column 2, lines 6 to 10 of Table I. The true adder 5E of stage E performs the addition shown in column 3, lines 1 to 5 of Table I, while the complement adders of that stage perform the addition indicated in column 3, lines 6 to 10 of Table I.

It should be clear from FIG. 2B and Table I, particularly in view of the detailed explanation of FIG. 2A, how the sum and carry outputs of the true and complement adders of each stage are utilized to effect the addition of the digits stored in the 2, 3 registers of that stage to produce a sum value stored in the 4 register of that stage, and to produce two signals which respectively indicate that the digital addition is complete and is correct. It should also be clear from FIG. 2B how the stage signals are combined to produce, by the AND circuit 11, a signal indicating that the addition of the aforesaid two binary numbers by the system has been completed and that the sum 111 stored in the 4 registers is correct.

It can be similarly be shown that the system of FIG. 2 can be used to effect subtraction by adding the true value of the binary digits stored in the 2D–2F registers to the complement of the true values of the binary digits stored in the 3D–3N registers. To effect subtraction, the output connections of each of the 3D–3N registers are reversed: i.e., the 0 output of each is supplied to the "true" adder 5 of the stage and the 1 output of each is supplied to the "complement" adder 6 of the stage: also the in-carry lines 19D, 27D of the first stage D are connected as by switches 32, 33 to the out-carry lines 19N, 27N of the highest order stage. The switching of the output connections from the 3 registers to the adders 5, 6 selectively to effect subtraction or addition is preferably effected by gating circuits such as shown in FIG. 3 and now described in detail.

Figure 3:
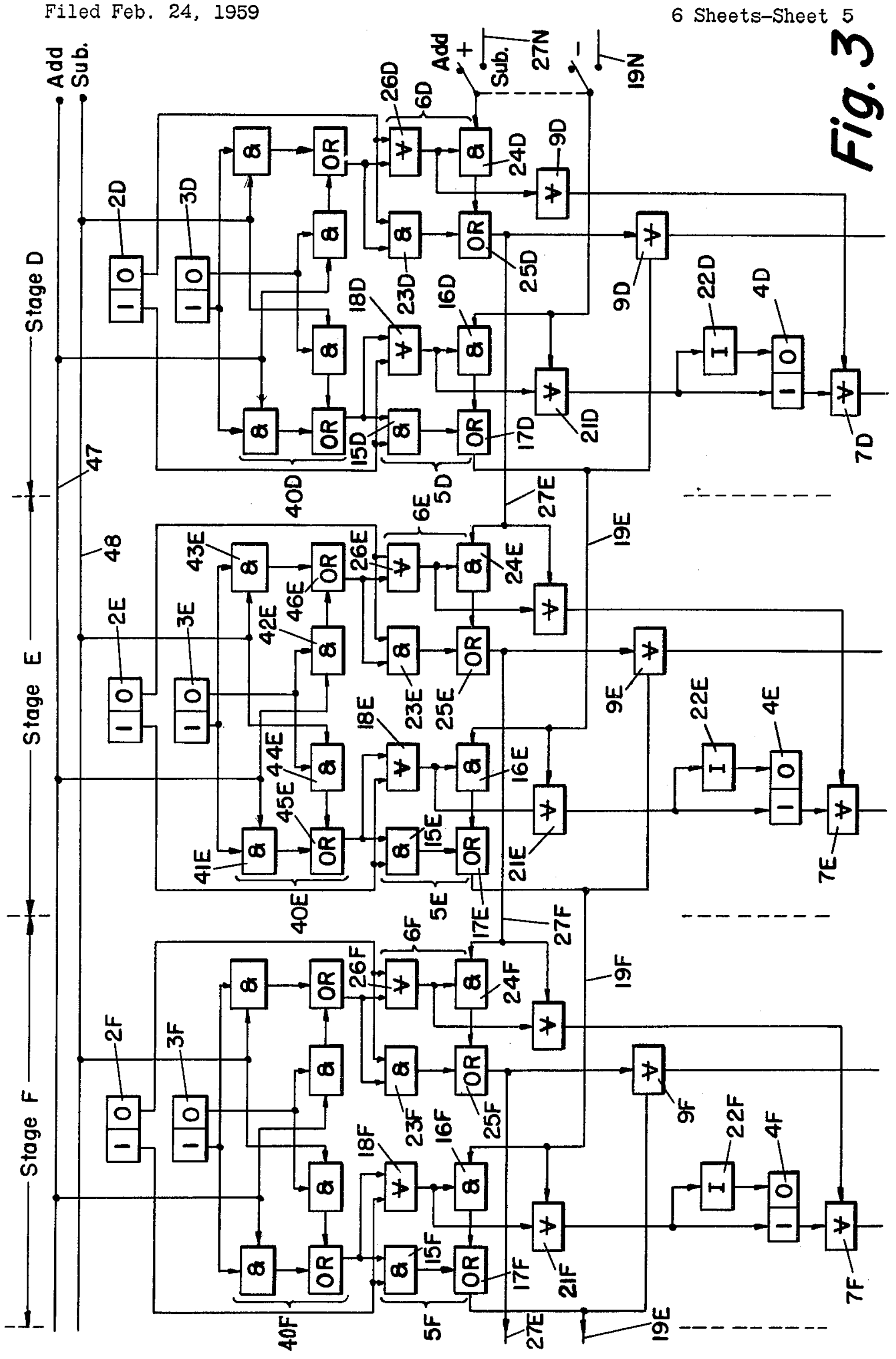
FIG. 3 is similar to FIG. 2 but additionally includes Add-Subtract gates.

FIG. 3 is similar to FIG. 2 except that in each stage an Add-Subtract gate is interposed between the B register 3 and the true and complement adders 5, 6. The corresponding components of all such gates are identified by similar reference characters plus a suffix identifying the stage. It is thus necessary to describe only one of the Add-Subtract gates.

Considering, for example, the Add-Subtract gate 40E, it comprises four And Circuits 41E–44E, and two OR circuits 45E, 46E. One input for each of the And Circuits 41E–42E is supplied from the Add-instruction line 47 common to all stages and one input for each of the AND circuits 43E, 44E is supplied from the Subtract-instruction line 48 common to all stages. The 1 output of Register 3E is applied to the second input of each of the AND gates 41E–43E and the 0 output of register 3E is applied to the second input of AND gate 42E, 44E. The outputs of AND gates 41E, 44E are applied to OR gate 45E whose output is applied to the true Adder 5E. The outputs of AND gates 42E, 43E are applied to OR gate 46E whose output is applied to the complement Adder 6E.

As will become clear from a following discussion of FIGS. 3A–3D, when the instruction to Add is given by applying a positive signal to line 47, all of the Add-Subtract gates 40D–40N are so conditioned that the B registers 3D–3N are effectively connected to the true and complement adders of each stage as in FIG. 2 to effect addition as described above in connection with FIG. 2. When the instruction to Subtract is given by applying a positive signal to line 48, all of the Add-Subtract gates are so conditioned that the output connections from B registers 3D–3N are reversed from that shown in FIG. 2 with respect to the true and complement adders to effect subtraction. For clarity, there are shown in FIGS. 3A–3D only the stage components directly associated wtih the Add-Subtract gate 40.

Figures 3A, 3B, 3C, 3D:
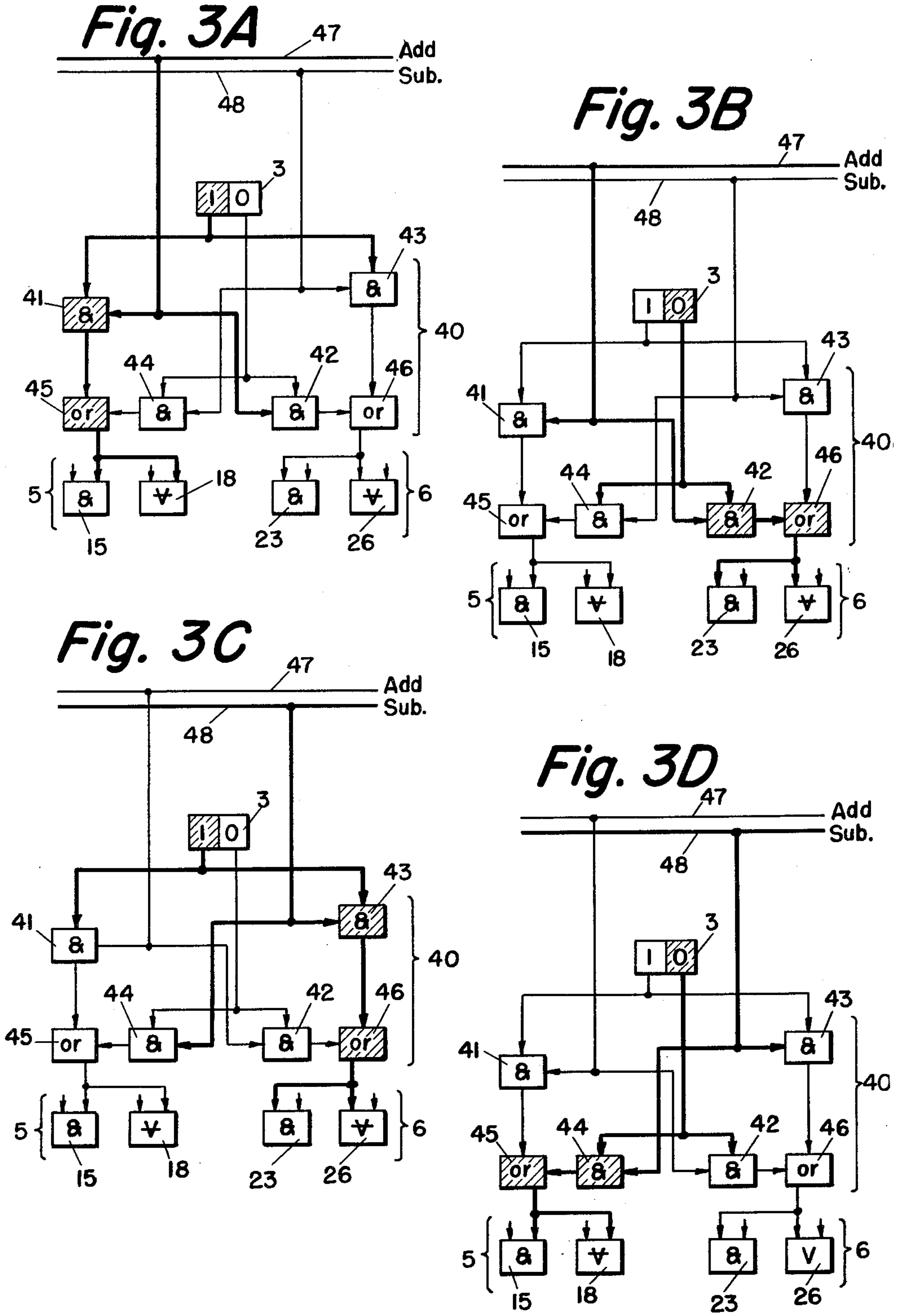
FIGS. 3A–3D are explanatory figures referred to in discussion of operation of the Add-Subtract gates of FIG. 3.

As indicated by the heavy lines in FIGS. 3A, 3B when the instruction to Add is given, one input of each of the AND gates 41, 42 is excited by the positive Add signal on line 47. Thus, if a 1 is stored in register 3 (FIG. 3A), both inputs of the AND circuit 41 are excited by positive signals and the positive output signal of AND-gate 41 is effectively passed or reproduced by OR gate 45 for application to one input of AND circuit 15 and of EXCLUSIVE-OR circuit 18 of the true Adder 5 of the stage so to introduce a 1 therein. Since no signal is passed from register 3 to the complement Adder 6, it effectively receives a 0. When, however, if a 0 is stored in register 3 (FIG. 3B), both inputs of AND gate 42 are excited by positive signals. The resulting positive output signal of AND gate 42 as applied to OR gate 46 produces a positive signal applied to one input of And circuit 23 and of EXCLUSIVE-OR circuit 26 of the complement Adder 6 so to introduce a 1 therein. Since no signal is passed from register 3 to the true Adder 5, it effectively receives a 0. Thus, with an Add instruction signal on line 47, the true value of the digit stored in register 3 is introduced into the true Adder 5 and the complement of that value is introduced into the complement Adder 6.

As indicated by heavy lines in FIGS. 3C, 3D, when the instruction to Subtract is given, one input of each of the AND circuits 43 and 44 is excited by the positive Subtract signal on line 48. Thus, if a 1 is stored in register 3 (FIG. 3C), both inputs of And circuit 43 are excited. The resulting positive output signal of And circuit 43 is effectively passed by OR circuit 46 to one input of And circuit 23 and of EXCLUSIVE-OR circuit 26 of the complement Adder 6 so to introduce a 1 therein. Since no signal is passed from register 3 to the true Adder 5, if effectively receives a 0. When, however, a 0 is stored in register 3 (FIG. 3D), both inputs of And Circuit 44 are excited by positive signals. The resulting positive output of And circuit 44 is effectively passed by OR circuit 45 to one input of And circuit 15 and of EXCLUSIVE-OR circuit 18 of the true Adder 5 so to introduce a 1 therein. Since no signal is passed from register 3 to the complement Adder 6, it effectively receives a 0. Thus, with a Subtract instruction on line 48, the complement of the true value of the digit stored in register 3 is introduced into the true Adder 5 and the true value is introduced into the complement Adder 6.

From the foregoing discussion of FIGS. 3A–3D, it should be clear how the system shown in FIG. 3 selectively effects addition or subtraction of binary numbers in manner above discussed in connection with FIG. 2 and also provides a check signal indicating the addition or subtraction is complete and correct.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. A multi-stage system suited for adding two binary numbers comprising means for storing signals respectively representative of the digits of said numbers, a first adding means in each stage for combining the signals representing the true values of the digits of the corresponding order and of the input carry from the preceding order stage to produce output signals respectively representing the sum of said true values and the carry for the next higher order stage, register means for storing the sum signals from said first adding means of the stages as the total sum of said binary numbers, a second adding means in each stage for combining signals representing the complement values of the digtis of the corresponding order and the complement of the carry input of that order to produce output signals representing the complement sum of the true digit values of that order and the complement of the carry to the next higher order stage, and means including means in each stage for comparing the outputs of said first adding means of the stage with the outputs of said second adding means of the stage to produce a signal indicating completion of the addition of the true values of said numbers and correctness of the total sum stored in said register means.

2. A system as in claim 1 in which the last-named means includes in each stage means for comparing the carry signal outputs of the two adding means of that stage to indicate completion of the addition of the digits of the corresponding order and storage of their sum in the register means, means for comparing the sum output signals of the two adding means of that stage to indicate correctness of the sum of the digits of the corresponding order as stored in said register means, and means responsive to the outputs of the two comparing means to produce a signal indicating completion by that stage of the addition of the digits of the corresponding order, completion of the carries and correctness of the registered sum of said digits.

3. A system as in claim 1 in which the last-named means comprises two AND gates, each having input circuits in number corresponding with the stages of said system, means for impressing on the input circuits of one of said AND gates signals respectively indicative of similarity or dissimilarity of carry signal outputs of the two adding means of the corresponding stage, means for impressing on the input circuits of the other of said AND gates signals respectively indicative of similarity or dissimilarity of the sum signal outputs of the two adding means of the corresponding stage, and means responsive to the outputs of said AND gates to produce the signal indicating completion of the addition of the two binary numbers and correctness of their sum as stored in said register means.

4. A multi-stage system suited for adding two binary numbers comprising in each stage a digital sum register, two adding means, the first for combining signals representing the true values of the digits of the corresponding order and the true value of the carry from the preceding stage, and the second for combining signals representing the complement values of the digits of the corresponding order and the complement value of the carry into the stage, said first adding means having a carry output signal passed to the next higher order stage and a sum output signal, means responsive to said sum output signal and to the true carry signal into the stage to provide a signal stored in said sum register as a "one" or a "zero," means responsive to the carry output signals of said first and second adding means to produce when they are complementary a "completion" signal indicative of the completion of carries, means responsive to the sum output signal of said second adding means and to the complement carry into the stage to produce a check signal, and means for comparing said check signal with the signal stored in said sum register to produce a "correct" signal when said check and stored signals are complementary.

5. A system as in claim 4 additionally including in each stage means jointly responsive to the "completion" and "correct" signals to produce a stage signal indicating that said stage has correctly completed the addition of the digits of the corresponding order including carries to and from the adjacent orders.

6. A system as in claim 4 additionally including means responsive to the "complete" and "correct" signals of the individual stages to produce a signal indicating completion by the system of the addition and indicating correctness of the total sum stored in its sum registers.

7. A system as in claim 4 additionally including a multi-input AND gate responsive to the "completion" signals of the individual stages to indicate when all carries involved in addition of said numbers and their complements have been completed.

8. A system as in claim 4 additionally including a multi-input AND gate responsive to the "correct" signals of the individual stages to indicate when the total sum stored in said registers is correct.

9. A system as in claim 4 additionally including two multi-input AND gates, one of which is responsive to the "completion" signals of the individual stages to indicate when all carries involved in addition of said numbers and their complements have been completed and the other of which is responsive to the "correct" signals of the individual stages to indicate when the total sum stored in said registers is correct.

10. A system as in claim 9 additionally including means for combining the outputs of said AND gates to produce a signal indicating completion of the addition of the two binary numbers and the correctness of their sum as stored in the register means of the stages.

11. A digital computer system suited for addition of binary numbers comprising a plurality of stages each including means for combining the true values of the digits of the corresponding order and of the input carry to produce a first sum output and a first carry output, means for combining the complement values of said digits and of the input carry to produce a second sum output and a second carry output, a first comparator for producing a "completion" signal when said first carry output is the complement of the second carry output, and a second comparator for producing a "correct" signal when said first sum output is the complement of the second sum output.

12. A system as in claim 11 additionally including means responsive to the outputs of all of the first and second comparators to produce a signal indicative of completion of the carries of all orders and correctness of the addition of said numbers.

13. A digital computer system suited for subtraction of binary numbers comprising a plurality of stages each including means for combining the true value of the minuend digit of the corresponding order, the complement value of the subtrahend digit of the corresponding order, and the true value of the in-carry to produce a first difference output and a first borrow output, means for combining the complement value of said minuend digit, the true value of said subtrahend digit and the complement value of said in-carry to produce a second difference output and a second borrow output, a first comparator means for producing a "completion" signal when said first borrow output is the complement of said second borrow output, and a second comparator means for producing a "correct" signal when said first difference output is the complement of said second difference output.

14. A system as in claim 13 additionally including means responsive to the outputs of all of the first and second comparator means to produce a signal indicative of completion of the carries of all orders and correctness of the difference of said binary numbers.

15. A multi-stage system suited for subtracting two binary numbers comprising means for storing signals respectively representative of the digits of said numbers, first adding means for combining in each stage signals respectively representing the true value of the subtrahend digit, the complement value of the minuend digit and the true value of the input carry from the preceding stage to produce output signals respectively representing the difference of the true value of said digits and the true carry for the next higher order stage, register means for storing the difference signals of said first adding means as the total difference of said binary numbers, second adding means for combining in each stage signals representing the complement value of said subtrahend digit, the true value of said minuend digit and the complement value of said input carry to produce output signals representing the complement of the difference of the true values of the digits and the complement of the carry for the next higher order stage, and means including means for comparing the outputs of said first adding means with the outputs of said second adding means to produce a signal indicating completion of the subtraction of said binary numbers and correctness of the total difference stored in said register means.

16. A multi-stage system suited for adding or subtracting two binary numbers comprising in each stage a C register for storing the computed sum or difference of the digits of the corresponding order, and A register for storing the augend-subtrahend digit of the corresponding order, a B register for storing the addend-minuend digit of the corresponding order, first and second full-adder means to which are applied A register outputs respectively representing the true and complement values of the digit stored therein, gating means between said B register and said first and second adder means, said gating means in response to an Add signal supplying to said first and second adder means B register outputs respectively representing the true and complement values of the digits stored in the B register and in response to a Subtract signal supplying to said first and second adding means B register outputs respectively representing the complement and true values of the digit stored in the B register, means for applying to said first and second adder means signals respectively representing the true and complement values of the carry from the preceding stage, the sum-difference output of said first full-adder means being applied for storage in said C register, and comparator means responsive to the sum-difference and carry outputs of said first and second full-adder means for producing a check signal when the corresponding outputs are complements of one another.

17. A system as in claim 16 additionally including means jointly responsive to the comparator means of all stages to produce a signal indicative of completed execution of the instruction to Add or Subtract and correctness of the total sum or difference of said two binary numbers as stored in the C registers.

18. A multi-stage system suited for adding and subtracting two binary numbers comprising in each stage a C register element for storing the computed sum or difference of the binary digits of the corresponding order, an A register element for storing the augend-subtrahend digit of the corresponding order, a B register element for storing the addend-minuend digit of the corresponding order, first and second full-adder means to which are applied from the A register element outputs thereof respectively representing the true and complement values of the digit stored therein, first and second AND circuits each having an input supplied by the 1 output of said B register element, third and fourth AND circuits each having an input supplied by the 0 output of said B register element, a first OR circuit having inputs respectively supplied by the outputs of said first and third AND circuits, a second OR circuit having inputs respectively supplied by the outputs of said second and fourth AND circuits, means for selectively applying an ADD signal to said first and third AND circuits for application to said first and second full-adder means respectively of the true and complement values of the digit stored in said B register element as represented by the outputs of said first and second OR circuits or a SUBTRACT signal to said second and fourth AND circuits for application to said first and second full-adder means respectively of the complement and true values of the digit stored in said B register element as represented by the outputs of said first and second OR circuits, means for applying to said first and second full-adder means signals respectively representing the true and complement values of the carry from the preceding stage, the sum-difference output of said first full-adder means being applied for storage in said C register element, and comparator means responsive to the sum-difference and carry outputs of said first and second full-adder means for producing a check signal when the corresponding outputs are complements of one another.

References Cited in the file of this patent

UNITED STATES PATENTS

| | | |
|---|---|---|
| 2,837,278 | Schreiner et al. | June 3, 1958 |
| 2,861,744 | Schmitt et al. | Nov. 25, 1958 |
| 2,905,833 | Miehle | Sept. 22, 1959 |
| 2,907,526 | Havens | Oct. 6, 1959 |
| 2,976,428 | Parkhill et al. | Mar. 21, 1961 |

OTHER REFERENCES

Progress Report No. 2 of EDVAC, Moore School of Engineering, University of Pennsylvania, available to public, February 13, 1947 (FIG. PY-O-216 and pages 1-4-3 to 1-4-7 relied on).

The Electronic Numerical Integrator and Computer (ENIAC) Mathematical Tables and Other Aids to Computation, vol. 1, April 1946, pages 98-9 relied on.